United States Patent [19]

Gibbard et al.

[11] Patent Number: 4,552,821
[45] Date of Patent: Nov. 12, 1985

[54] SEALED NICKEL-ZINC BATTERY

[75] Inventors: Henry F. Gibbard, Schaumburg; Richard C. Murray, Jr.; Ronald A. Putt, both of Palatine; Theodore W. Valentine, Algonquin, all of Ill.; Claude J. Menard, St. Paul, Minn.

[73] Assignee: Duracell Inc., Bethel, Conn.

[21] Appl. No.: 612,290

[22] Filed: Aug. 6, 1984

Related U.S. Application Data

[63] Continuation of Ser. No. 509,686, Jun. 30, 1983, abandoned, which is a continuation-in-part of Ser. No. 402,383, Jul. 27, 1982, abandoned.

[51] Int. Cl.$^4$ .......................................... H01M 10/52
[52] U.S. Cl. ....................................... 429/57; 429/59; 429/217; 429/94
[58] Field of Search ................. 429/57, 94, 229, 217, 429/59, 206

[56] References Cited

U.S. PATENT DOCUMENTS

| | | | |
|---|---|---|---|
| 3,669,746 | 6/1972 | Devitt et al. | 429/94 |
| 3,951,687 | 4/1976 | Takamura et al. | 429/94 |
| 4,022,953 | 5/1977 | Charkey | 429/229 |
| 4,037,033 | 7/1977 | Takamura et al. | 429/229 |

FOREIGN PATENT DOCUMENTS

| | | | |
|---|---|---|---|
| 1094534 | 8/1976 | Japan | 429/217 |
| 6032365 | 9/1976 | Japan | 429/217 |
| 2062633 | 5/1977 | Japan | 429/57 |
| 8020651 | 6/1978 | Japan | 429/57 |
| 3074247 | 7/1978 | Japan | 429/217 |
| 3092446 | 8/1978 | Japan | 429/57 |

OTHER PUBLICATIONS

Translation of Japanese Application-Laid-Open-to-Public No. 138021/78, Inventor-T. Sakagami et al., 12/2/1978.

Primary Examiner—Donald L. Walton
Attorney, Agent, or Firm—Ronald S. Cornell; Israel Nissenbaum

[57] ABSTRACT

A sealed, rechargeable nickel-zinc cell includes a zinc electrode active mass essentially free of zinc metal when at full discharge, a carboxylated styrene-butadiene binder retaining the zinc electrode mixture in a coherent structure, a predetermined amount of cadmium being included in the zinc electrode mixture, a separator preferably comprising at least two layers of material free of any adhesive binding the layers together and a wicking layer positioned between the nickel positive electrode and the separator.

11 Claims, 4 Drawing Figures

SEALED NICKEL-ZINC BATTERY

This application is a continuation of application Ser. No. 509,686, filed June 30, 1983, now abandoned, which is a continuation-in-part of application Ser. No. 402,383, filed July 27, 1982, now abandoned.

BACKGROUND OF THE INVENTION

1. Field Of The Invention

This invention relates to electrochemical cells and more particularly, to sealed, rechargeable nickelzinc cells.

2. Description Of The Prior Art

Many kinds of portable equipment, such as, for example, tape and video recorders, power tools, calculators, radios, electric razors, television sets, telephone pagers, microcomputers, and the like, have been developed over the last several years; and their use has become relatively widespread. In some situations, a primary battery or cell has been utilized as the power source. However, while primary cells offer the advantage of relatively high enery densities, these are relatively expensive because of the continual need for replacement.

For this reason, it has been useful to employ a rechargeable cell as the power source. Various types of lead-acid cells have been utilized, particularly where cost is the primary consideration. However, such cells have relatively low energy densities and cycle life capabilities, as well as requiring relatively long times for charging.

The inadequacies of primary and lead-acid cells have led to the use of nickel-cadmium cells in some applications. Such cells, while relatively expensive in comparison to lead-acid cells, offer relatively high energy densities and an extremely long cycle life. Moreover, this type of cell is capable of being employed at relatively high charge/discharge rates.

Despite the advantages provided by nickel cadmium cells, there is a continuing demand for many applications for a power source capable of achieving even higher energy densities and operating at higher working voltages. This situation has led to the investigation of nickel-zinc rechargeable cells for these applications. The nickel-zinc system is well known and, at least potentially, offers substantial advantages. In comparison to nickel-cadmium cells, nickel-zinc cells have higher working or operating voltages (viz. about 1.65 volts) and potentially can provide significantly higher energy densities. U.S. Pat. Nos. 3,951,687 and 4,037,033 disclose configurations for nickel-zinc cells.

Despite this promise, the commercial use of nickel-zinc cells for the portable applications described herein has been extremely limited. This is principally due to the inability to deal adequately with the relatively high internal pressures inherent in this system. Thus, while the cadmium electrode in a nickel-cadmium cell is marginally thermodynamically stable with respect to reduction of aqueous alkaline battery electrolytes with consequent evolution of hydrogen gas, the zinc electrode in a nickel-zinc system is unstable. The nickel-zinc system accordingly tends to evolve hydrogen gas under all conditions of service, viz., charge, discharge, overcharge and open-circuit stand.

To be commercially useful, a sealed nickel-zinc cell must therefore possess the ability to compensate for the hydrogen gas evolved so that the cell under conditions of use should not vent. If the cell vents, decreased performance can result if enough electrolyte is lost. Moreover, discharge of alkaline eletrolyte into the environment could be harmful to electronic or other components in the area where the cell is employed. The internal pressures which can be tolerated depend upon the strength of the containers utilized. For small cylindrical cells that typically use container materials which will rupture at about 450 to 500 p.s.i.g. (at such pressures the container top typically separates from the container), safety considerations dictate that venting means be employed which will vent at internal pressures of about 250 p.s.i.g. or so. In prismatic cells, the plastic container materials typically used require that such cells vent at significantly lower internal pressures, viz. —about 25 p.s.i.g. or so.

The internal pressures developed in sealed nickel-zinc cells under conditions of use can readily exceed 250 p.s.i.g. under various conditions. A considerable amount of effort has been expended to develop a nickel-zinc system capable of operation at satisfactorily low internal pressures.

In addition, there are a number of other problems involved in developing commercially practical sealed nickel-zinc cells. Thus, regardless of the means utilized to compensate for the hydrogen gas evolved, problems of undue pressure build-up have been found to occur upon stand. It has thus been found that, if nickel-zinc cells are allowed to stand in a completely discharged condition for an extended period of time, the internal pressure build-up can reach a level where venting of the cell occurs.

A further problem resides in the relatively high impedance values of the prior nickel-zinc cells. For whatever reason, prior nickel-zinc cells seem to be characterized by impedance levels which restrict the current levels that can be utilized.

Still further, prior cells of this type appear to have less than an optimum tolerance to overcharge conditions. While not fully understood, it is believed that the less than optimum tolerance is due to the separator configurations previously utilized. Also, in this regard, it appears that the cycle life of nickel-zinc cells, particularly at high discharge rates, are less than optimum.

Lastly, prior cells of this type seem to result in service in zinc passivation. This, of course, can adversely affect the capacity.

Accordingly, despite the prior efforts to provide a commercially viable sealed, nickel-zinc cell, such cells still have made little, if any, inroad as replacements for the various power sources now employed for portable equipment applications. There certainly exists the need to provide a commercially attractive and cost-effective sealed nickel-zinc cell capable of obviating to a satisfactory degree the various problems discussed herein.

OBJECTS OF THE INVENTION

It is accordingly a principal object of the present invention to provide a sealed, nickel-zinc cell providing improved cycle life and electrical performance in service.

Another object is to provide a cell of the foregoing type that is simple in construction and which is capable of being economically manufactured.

A still further object of this invention lies in the provision of a cell of the foregoing type having the capability of operation at relatively high current levels.

Yet another object of this invention is to provide a cell of the foregoing type capable of being allowed to stand for prolonged periods of time in a discharged condition without undue internal pressure build-up.

Another object of the present invention is to provide a cell of the foregoing type which minimizes zinc passivation.

A still further object is to provide a cell of the foregoing type which possesses improved tolerance to overcharge conditions.

Other objects and advantages of the present invention will become apparent from the following detailed description, and from the drawings in which.

Figure 1:
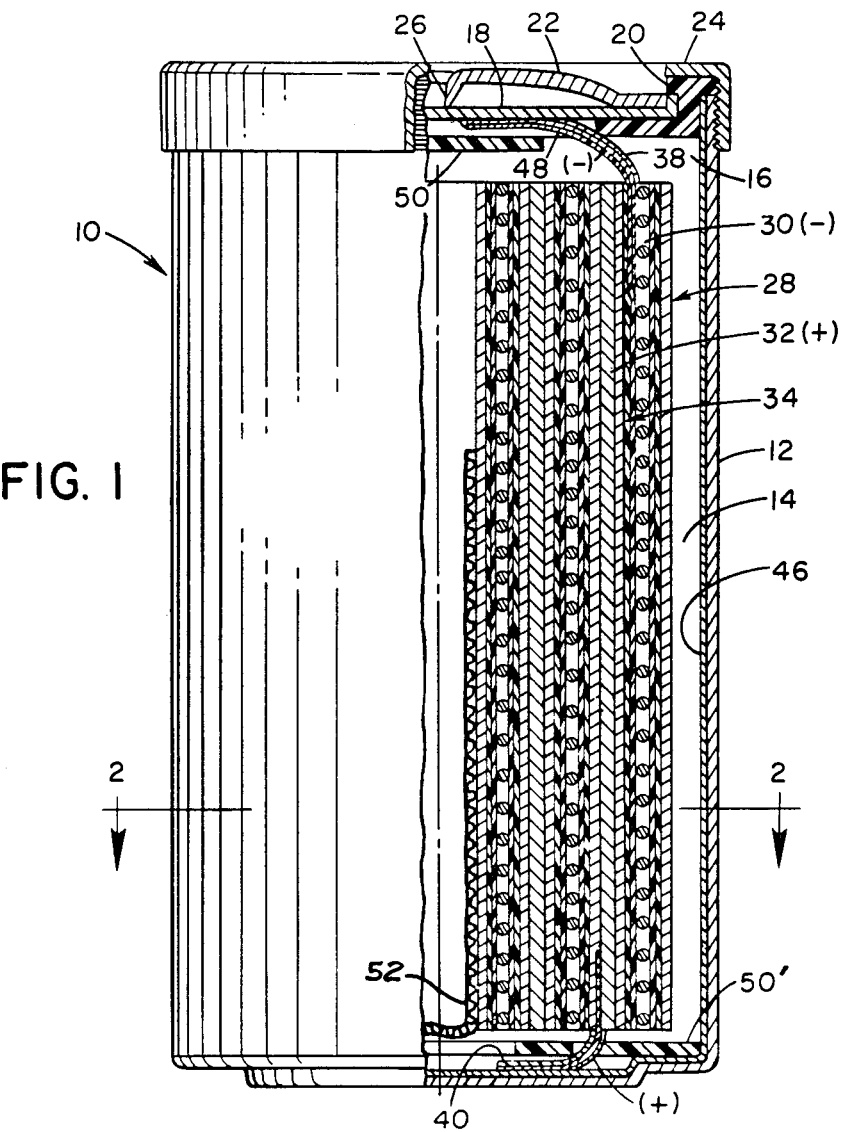
FIG. 1 is a side elevation of a nickel-zinc cell embodying the present invention and partially cut-away to show the internal configuration.

While the invention is susceptible to various modifications and alternative forms, there is shown in the drawings and will herein be described in detail, the preferred embodiments. It is to be understood, however, that it is not intended to limit the invention to the specific forms disclosed. On the contrary, it is intended to cover all modifications and alternative forms falling within the spirit and scope of the invention as expressed in the appended claims.

SUMMARY OF THE INVENTION

In general, the present invention is predicated on the discovery that nickel-zinc cells having improved electrical performance characteristics can be provided by selection of the mixture utilized for the negative electrode, the particular binder employed for the negative electrode, and the separator system utilized. Each of these parameters will individually impart improved performance to the cell. Optimum performance is provided by utilizing all of the features which will be described herein.

In addition, for some applications, an auxiliary feature of this invention provides a specific means for dealing with the internal pressure build-up due to the evolution of hydrogen.

DETAILED DESCRIPTION OF THE INVENTION

Turning now to the illustrative embodiment, there is shown in the drawings a rechargeable, sealed nickel-zinc cell incorporating the present invention, the cell being generally designated at 10. The particular configuration of the cell is only exemplary, and may be modified as desired. The cell 10 comprises an outer housing 12 defining a cell 14. The cup-shaped housing 12 has an open end 16 which is closed by closure 18 sealingly mounted upon open end 16 by an annular insulator 20. A perforator disc 22 is secured to the open end 16 of the outer housing 12 by an annular retainer 24 and is provided with a piercing tab 26 adapted to pierce closure 18 in the event the closure is urged outwardly, as by internal pressure buildup within the sealed battery. If desired, a resealable vent could be employed; and many such vent constructions are known.

Figure 2:
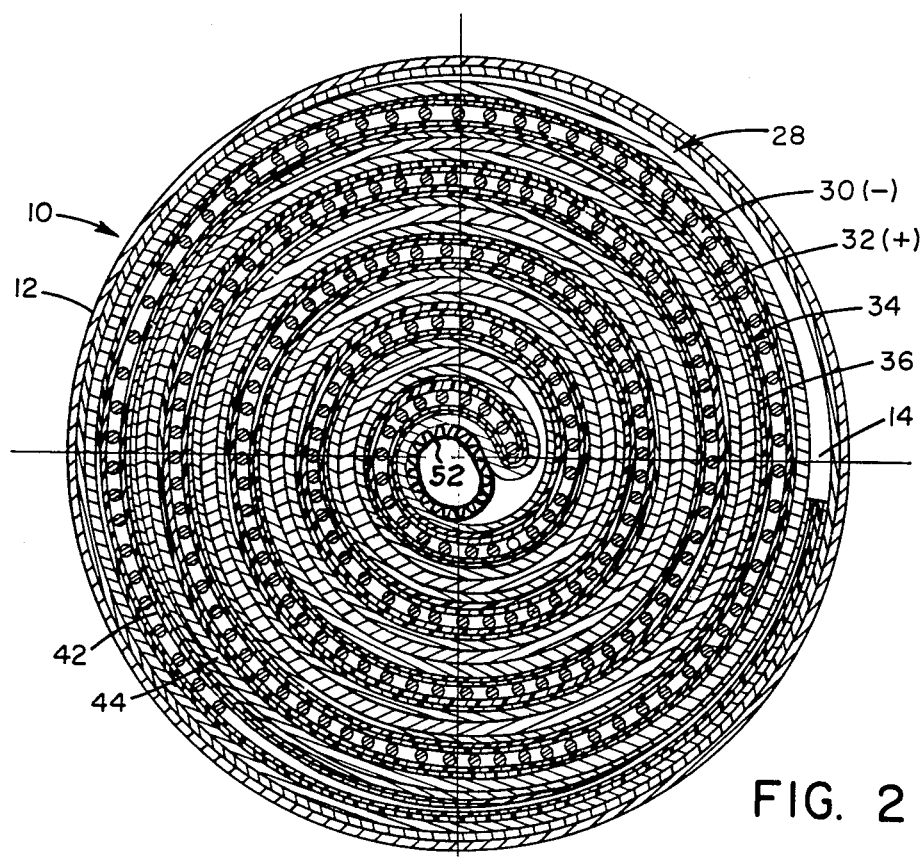
FIG. 2 is a cross-sectional view taken generally along lines 2—2 of FIG. 1 and further illustrating the internal configuration of a cell according to the present invention.

As best seen in FIG. 2, a cell element shown generally at 28 is contained in cell 14 in the form of a wound roll comprising a negative electrode layer 30, a positive electrode layer 32, and a separator shown generally at 34, intermediate the electrode layers.

Pursuant to one aspect of the present invention, a wicking layer for absorbing electrolyte is preferably provided. It has thus been found that the inclusion of a wicking layer on the side of the separator adjacent the positive electrode layer serves to impart to the cell longer cycle life, particularly when the service regime involves relatively high discharge rates (e.g. —about 2C or higher).

Any alkali-resistant material capable of absorbing electrolyte can be utilized. In general, a non-woven fabric of a synthetic resin, such as polypropylene, may be employed. One illustrative example of a suitable polypropylene wicking sheet is "Webril 1488" non-woven fabric (Kendall Company) having a thickness of about 3 mils.

Accordingly, as best seen in FIG. 2, a wicking layer 36 for absorbing electrolyte is provided on the side of the separator 34 adjacent the positive electrode layer 32. A wicking layer could be likewise provided adjacent the negative electrolyte layer 30, if desired. However, and while the use of a wicking layer adjacent the negative electrode may offer advantage in relation to the inclusion of no wicking layer adjacent either electrode, it has been found that superior performance is achieved when a wicking layer is present only on this side of the separator adjacent the positive electrode layer.

As best seen in FIG. 1, perforator disc 22 cooperates with closure 18 in defining the negative terminal of the housing. More specifically, a first connecting means tab 38 is electrically connected to the negative electrode layer 30, extending outwardly from the roll into electrically connected association with closure 18.

Outer housing 12 suitably comprises a metal can which defines the positive terminal of the battery. Thus, as is illustrated in FIG. 1, a second connecting tab means 40 is electrically connected with positive electrode layer 32 and housing 12.

When utilized in a cylindrical cell, as is shown in the illustrative embodiment, the positive and negative electrode layers and the separator should be sufficiently flexible so that a wound element can be provided. The manufacturing techniques to provide suitable positive and negative electrode layers of adequate flexibility are well known. Suitable techniques are described in the copending Menard et al. application identified herein.

The negative zinc electrodes may thus be made by conventional techniques. As one example, a powdered mixture of the desired materials and a binder can be rolled onto a suitable current collector, such as, for example, a copper screen.

While such mixtures have previously utilized both zinc oxide and zinc, it has been found that the presence of zinc metal tends to result in undesired pressure buildup if the cell is allowed to stand in a completely discharged condition for an extended time period. This pressure build-up could reach a level causing the cell to vent. For this reason, pursuant to a principal aspect of the present invention, the mixture utilized incorporates little or no zinc metal.

A variety of binder materials for fabricating zinc electrodes is known. Typically, the binder material used is inert in the cell environment and is incorporated in an amount just sufficient to hold the mixture together, providing a positive bond as well to the current collector.

Previously utilized binder materials, such as polytetrafluoroethylene, require relatively large amounts to be employed in order to achieve the desired coherent structure for the negative electrode, amounts on the order of 10% by weight based upon the weight of the mixture often being used. Such relatively large amounts of binder result in the cell having relatively high impedance values. This restricts the current level which the cell can utilize in service.

Accordingly, a further principal aspect of the present invention comprises utilizing an elastomeric, self-cured carboxylated styrene-butadiene latex as the binder material. It has been found satisfactory to utilize this binder in an amount preferably in the range of about 3.8% to about 5%, based upon the total weight of the negative electrode mixture. Amounts in this level have been found to achieve an adequate coherent structure for the negative electrodes. Moreover, and importantly, this results in cells characterized by relatively low impedance in comparison to prior cells and may thus allow significantly higher current levels in service. Amounts in excess of 5% by weight may certainly be utilized, but such amounts offer little advantage and tend to provide increased impedance. Specific illustrative examples of suitable binders are AMSCO RES 4150 and 4816, manufactured by the AMSCO Division of Union Oil Company.

If desired, the negative electrode may contain other ingredients, some of which are known. Moreover, pursuant to a further aspect of the present invention, it has been found useful to include a minor but significant amount of cadmium. This is believed to act to stabilize the negative electrode against shape change as well as reducing the rate of evolution of hydrogen. Indeed, the cadmium present is electrochemically inert until the operating cell voltage has decreased to about 1.30 volts or so. Under these conditions, the inclusion of cadmium appears to serve to minimize zinc passivation that would otherwise occur.

The amount of cadmium utilized should be such as to provide 20% of the ampere-hour capacity of the positive active material. Amounts above this minimum level may certainly be utilized, the upper limit likely being constrained by economic considerations. Based upon the total weight of the negative electrode mixture, the amount of cadmium in the range of about 5 to 6% or so should be suitable to provide such minimum.

The cadmium component may be utilized in the mixture as cadmium oxide. However, as has been noted in the copending Gibbard application, it is perferred to utilize cadmium metal. The use of cadmium oxide may accordingly result in some loss in capacity.

It has also been found useful to include in the negative electrode mixture bismuth oxide, $Bi_2O_3$, in an amount of about 7 to 8% based upon the weight of the negative electrode mixture. This is believed to function as a corrosion inhibitor.

Prior techniques have utilized calcium hydroxide as a further component of the negative electrode mixture. The negative electrode mixtures described herein provide satisfactory performance; and, accordingly, there is no necessity for including calcium hydroxide. It is accordingly preferred that the negative electrode mixture be essentially free of calcium.

As is well known, in nickel-zinc systems using conventional aqueous solutions, such as potassium hydroxide, as an electrolyte, the zinc specie(s) formed during discharge is soluble in the electrolyte to a signficant extent. Some of the active zinc material thus tends to enter the electrolyte while the system is being discharged, as well as while the system stands in a discharged condition. Upon recharging of the battery system, the zinc specie(s) in the electrolyte returns to the zinc electrode but can alter the electrode structure. The active zinc material can thus migrate from the edges or periphery of the electrode structure and collect in the central regions of electrode, resulting in an irreversible loss of capacity. This phenomenon has been often termed "shape change".

Because of this phenomenon, the cell element utilized in the present invention should be positioned in the cell in a fashion which will at least minimize shape change. It has been found satisfactory, when a cylindrical cell is involved, simply to wind the element such that the element is under compression while in position within the cell. This assists in minimizing shape change as a problem.

As is likewise well known, the replating or redeposition of zinc often occurs in the form of treed or branched crystals having sharp points (dendrites) which can readily bridge the gap between the plates or electrodes of opposite polarity, thereby causing short circuits and the destruction of the cell. Accordingly, the material used for the separator should be a membrane having a relatively fine, uniformly sized pore structure which allows electrolyte permeation therethrough while preventing dendrite penetration. Still further, the material employed should possess chemical stability in the cell environment. Additionally, suitable materials should possess sufficient flexibility and strength characteristics to endure adequately any shape change and/or electrode expansion that might take place during service. A large number of materials have been proposed for use and are well known, as are their methods of manufacture.

As one illustrative example, the separator may comprise a commercially available "Celgard" polypropylene film (Celanese Fiber Company). It has been found particularly desirable to utilize two layers of such material (each layer about one mil thick being adequate) to form the separator layer 34, the individual layers being shown generally at 42 and 44 (FIG. 2). The use of two layers allows the large pores or holes, due to imperfections produced during manufacture or subsequently, in each layer to be non-aligned with respect to each other to minimize problems with dendrites. Of course, a single layer or more than two layers may likewise be employed if desired.

Prior techniques have utilized either films such as polyvinyl alcohol on the separator or as cements to bond the individual layers together to form a composite, integral structure. However, it has been found that such techniques substantially decrease the tolerance of the cell to overcharge conditions. Pursuant to yet another aspect of the present invention, it is preferred to utilize a separator construction free of any film on the separator layer or layers utilized and with no cement or other bond being employed where multiple separator layers are utilized. In this fashion, the resulting cell has been found to possess superior tolerance to overcharge conditions.

Any conventional alkaline electrolyte used with a nickel-zinc system may be employed. As one example, it is satisfactory to utilize an aqueous potassium hydroxide solution containing about 25% by weight potassium hydroxide. It is desirable to utilize initially an electrolyte saturated with $Zn(OH)_2$ so as to prevent initial dissolution of zinc oxide into the electrolyte. As is known in the sealed cell art, the amount of electrolyte used should be restricted sufficiently so that an effective oxygen recombination reaction will be provided. In the illustrative embodiment, the necessary electrolyte can be added to the open space in the core of the wound cell element 28 prior to the sealing of the cell.

With respect to the first connecting tab 38, this should be made of a conductive material having an overvoltage for hydrogen evolution at least approximately as high as that of zinc. An illustrative example is a nickel element, plated with copper and then overplated with silver. The closure 18 may suitably comprise a steel sheet plated with nickel which is, in turn, covered with copper plating, and then covered with silver plating. The second connecting tab 40 may comprise, for example, a nickel element which is electrically connected to the nickel plating 46 of outer housing 12.

A wide variety of materials are known for the connecting tabs and the housing for nickel-zinc systems, and such materials may be utilized in the nickel-zinc cell of the present invention. The particular materials of construction may accordingly vary rather widely.

Further, if desired, a water sealant coating, as is known, may be applied to the metal or other surfaces in the cell. A suitable sealant is the styrene-butadiene material described herein as the binder for the negative electrode mixture. As shown in FIG. 1, a coating 48 has been applied to the exposed surfaces of the closure 18 and the first connecting tab 38. This may be applied by brushing on to a thickness, for example, of about 1 mil.

In addition, to insure that adequate insulation is provided between the cell element 28 and the terminals, insulators 50, 50' may be included, if desired. While shown as spatially removed from the cell element 28 for simplicity of illustration, insulator 50 may suitably rest upon separator layers 42, 44 which desirably terminate somewhat above the upper end of the electrodes.

The nickel-zinc cell of the present invention may be utilized in either a prismatic or cylindrical design, as is desired for the particular application. Likewise, the capacity of the cell may vary within wide limits, the size being dictated by the requirements of the particular end use application. As one example, a cylindrical sub-C size cell for use in cordless or portable power tools may suitably have a capacity of, for example, 1.2 Ampere-Hours.

The cells of the present invention must likewise incorporate a means for oxidizing the hydrogen evolved in service to maintain a satisfactorily low internal pressure within the cell. A variety of catalytic means are known and may be employed.

In this regard, an auxiliary aspect of the present invention provides as the hydrogen oxidation source a hydrogen recombination catalyst located in the cell which is free of electrical connection to the cell elements. Any fuel cell cathode may suitably be employed. As an illustrative example, the recombination catalyst may suitably comprise carbon cloth having about 1% by weight platinum catalyst on carbon particles bonded to the cloth by a hydrophobic binder, such as polytetrafluoroethylene. Suitable recombination catalysts such as the illustrative embodiment are commercially available. As is seen in the drawings, a hydrogen recombination catalyst 52 is positioned in the axial core space of the wound role cell element and is free of electrical connection to the cell electrodes. In this fashion, the assembly of the cell is facilitated.

Utilization of the hydrogen recombination catalyst has been found to substantially reduce the internal pressure developed under typical cycling conditions. However, the performance upon prolonged stand and high rate charge/discharge conditions can certainly be improved. Under either of these conditions, internal pressure can develop to the point where the cells may well vent.

For these reasons, it is preferred to utilize, as the means for dealing with the hydrogen evolution the invention in the co-pending Gibbard et al. application, identified herein. More specifically, it is preferred to utilize a positive electrode which contains a catalyst such as silver for the oxidation of hydrogen. Sealed nickel-zinc cells utilizing this approach are characterized by relatively low internal pressures in use and on stand and are capable of bieng operated under relatively high rate charge and discharge without building up pressures that would cause venting.

Figure 3:
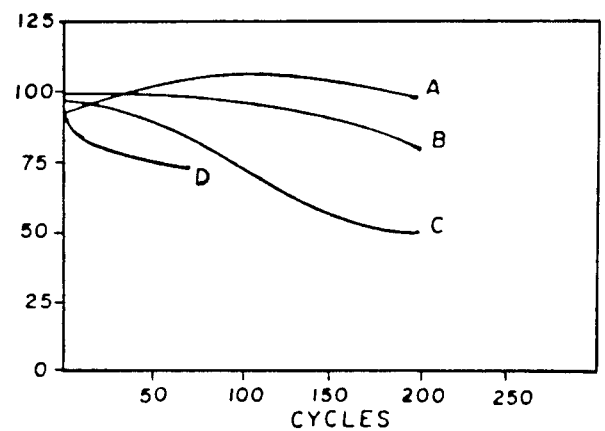
FIG. 3 is a graph illustrating the cycle life performance of a cell of the present invention compared to prior art cells.

FIG. 3 demonstrates the extended cycle life of cells pursuant to the present invention at high discharge rates. Curves A and C of FIG. 3 represent discharge curves of cells according to the present invention at two hour and one-half hour rates, respectively. Curves B and D are discharge curves for previous state-of-the-art nickel-zinc cells at 2.5-hour and 1-hour discharge rates, respectively. These latter rates should be substantially less stressful than the corresponding rates used for the cells of this invention. As may be seen in FIG. 3, the discharge capacity of the cells of this invention is maintained substantially higher than the discharge capacity of a conventional nickel-zinc cell up to two hundred cycles or more.

Figure 4:
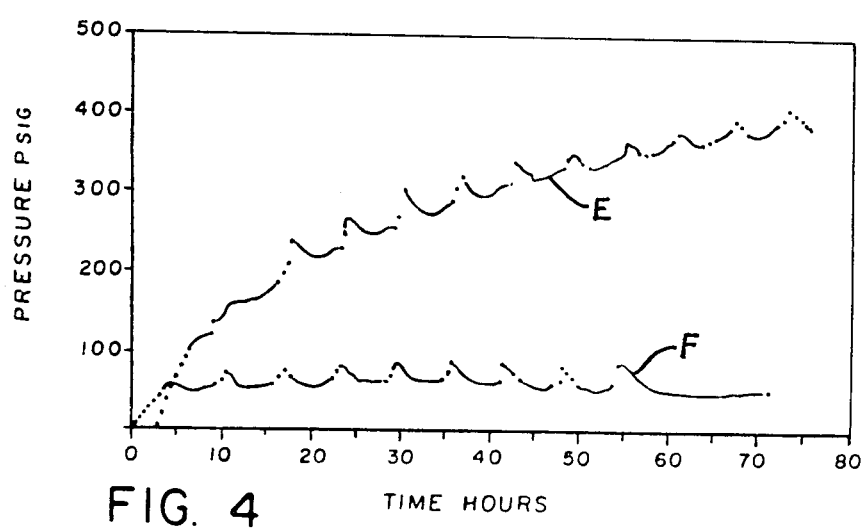
FIG. 4 is a graph illustrating the hydrogen pressure developed within a nickel-zinc cell with and without the hydrogen recombination catalyst utilized according to one aspect of the present invention.

FIG. 4 illustrates the performance of a cell which is achieved using the hydrogen recombination catalyst 52. Curve E illustrates the hydrogen pressure developed in the absence of the recombination catalyst 52, and the Curve F illustrates the hydrogen pressure developed in the cell where the recombination electrode 52 is provided. The substantial decrease in the developed pressure due to the inclusion of the recombination catalyst is apparent.

One example of suitable parameters to provide a 1.2 Ampere-Hour, sub-C size, cell pursuant to the present invention is as follows. The negative electrode layer comprises a first mixture of zinc, zinc oxide, cadmium oxide, bismuth oxide and a styrene-butadiene binder rolled onto a copper screen. Based upon the weight of the mixture, zinc was present in an amount of 4.5%, cadmium oxide in an amount of 5.8%, bismuth oxide in an amount of 7.5% and binder in an amount of about 4%, the balance being zinc oxide. The hydrogen recombination catalyst comprised a 0.1 inch $\times$ 1 inch carbon cloth strip containing 1% by weight platinum. The negative electrode dimensions were 0.016 inch $\times$ 1.31 inch $\times$ 9 inch and the positive electrode dimensions were 0.028 inch $\times$ 1.2 inch $\times$ 7 inch.

The negative electrode may initially contain a charged zinc mass in the amount of about 35% of the total theoretical Ampere-Hour capacity; however, this should be converted to zinc oxide by the reaction of the zinc with the added cadmium oxide and bismuth oxide. The resulting cadmium should represent about 25% of the 1.2 Ampere-Hour battery capacity. The amount of zinc oxide initially present is roughly 425% of the Ampere-Hour capacity of the cell, the actual capacity being limited by the positive electrode.

We claim:

1. A sealed, rechargeable nickel-zinc cell comprising a sealed housing defining a cell space, an electrochemical cell element contained in said cell space, said electrochemical cell element comprising a wound roll and including a zinc electrode comprising a current collector and an active mass, a nickel electrode and a separator therebetween, a predetermined amount of an alkaline electrolyte contained in said cell housing, a positive terminal electrically connected to said nickel electrode, a negative terminal electrically connected to said zinc electrode, and means for oxidizing hydrogen evolved in service to maintain a satisfactorily low internal pressure within said cell; characterized in that said zinc electrode active mass is essentially free of zinc metal and comprises zinc oxide admixed with cadmium metal, and wherein said said electrochemical cell element is wound such that the element is under compression, and said separator comprises a microporous material and is free of coating material.

2. The cell of claim 1 wherein said zinc electrode comprises a mixture of zinc oxide, metal in an amount to provide at least about 20% of the Ampere-Hour capacity of the nickel electrode and a carboxylated styrene butadiene binder in an amount sufficient to provide a coherent zinc electrode structure.

3. The cell of claim 2 wherein said binder is present in an amount of from about 3.8 to about 5%, based upon the weight of the zinc electrode active mass.

4. The cell of claim 2 wherein said zinc electrode includes bismuth oxide.

5. The cell of claim 1 wherein said cell space is cylindrical and the wound roll comprising said electrochemical cell element has an axial core space.

6. The cell of claim 5 wherein said hydrogen oxidation means comprises a hydrogen recombination catalyst positioned in the core space of said wound roll and being free of electrical connection to said cell element.

7. The cell of claim 6 wherein said hydrogen recombination catalyst comprises a carbon strip having platinum catalyst carried thereon.

8. The cell of claim 1 wherein said separator comprises at least two layers of microporous polypropylene.

9. The cell of claim 1 wherein said alkaline electrolyte is an aqueous potassium hydroxide solution.

10. The cell of claim 1 wherein said electrochemical cell element includes an electrolyte absorbing wicking layer positioned between said nickel electrode and said separator.

11. The cell of claim 10 wherein said wicking layer comprises a non-woven polypropylene material.

* * * * *